May 18, 1965 W. K. TAYLOR 3,184,711

RECOGNITION APPARATUS

Filed Sept. 17, 1959 6 Sheets-Sheet 1

Inventor
Wilfred K. Taylor
By
Cushman, Darby & Cushman
Attorneys

May 18, 1965 W. K. TAYLOR 3,184,711

RECOGNITION APPARATUS

Filed Sept. 17, 1959 6 Sheets-Sheet 2

Inventor
Wilfred K. Taylor
By
Cushman, Darby & Cushman
Attorneys

May 18, 1965 W. K. TAYLOR 3,184,711

RECOGNITION APPARATUS

Filed Sept. 17, 1959 6 Sheets-Sheet 3

Inventor
Wilfred K. Taylor
By Cushman, Darby & Cushman
Attorneys

May 18, 1965 W. K. TAYLOR 3,184,711

RECOGNITION APPARATUS

Filed Sept. 17, 1959 6 Sheets-Sheet 4

Inventor
Wilfred K. Taylor
By
Cushman, Darby & Cushman
Attorneys

FIG. 9.

OUTPUT VOLTAGE

| INPUT LETTER | $G_A$ | $G_B$ | $G_C$ | $G_D$ |
|---|---|---|---|---|
| A | −32 | +4.0 | +10.9 | +5.4 |
| B | +7.0 | −35 | −8.9 | −10.1 |
| C | +11.8 | −10.7 | −30 | +1.04 |
| D | +1.6 | −16.0 | −3.9 | −29 |

FIG. 10.

OUTPUT VOLTAGE

| INPUT LETTER | $D_A$ | $D_B$ | $D_C$ | $D_D$ |
|---|---|---|---|---|
| A | +32 | 0 | 0 | 0 |
| B | 0 | +35 | 0 | 0 |
| C | 0 | 0 | +30 | 0 |
| D | 0 | 0 | 0 | +29 |

Inventor
Wilfred K. Taylor
By Cushman, Darby & Cushman
Attorneys

Inventor
Wilfred K. Taylor
By
Cushman, Darby & Cushman
Attorneys

United States Patent Office 3,184,711
Patented May 18, 1965

3,184,711
RECOGNITION APPARATUS

Wilfred Kenelm Taylor, Chiswick, London, England, assignor, by mesne assignments, to International Business Machines Corporation, New York, N.Y., a corporation of New York Filed Sept. 17, 1959, Ser. No. 840,743
Claims priority, application Great Britain, Sept. 18, 1958, 29,982/58
13 Claims. (Cl. 340—146.3)

This invention relates to apparatus for recognising spatial patterns or distributions of light intensity and has for a principal object the provision of a relatively simple form of recognition apparatus which is capable of recognising a prescribed series of patterns. In particular, the invention has for an object the provision of recognition apparatus suitable for use in reading alpha numeric characters and for translating them, for example into digital form, whereby to provide signals suitable for insertion into a computor. A further object of the invention is to provide apparatus for use in the recognition of handwriting such as signatures.

Other objects and advantages of the invention will become apparent during the course of the following description of the improved recognition apparatus with reference to the accompanying drawings, in which:

FIGURES 1 to 4 show respectively the first four letters of the alphabet projected on to a mosaic of eighty-one transducers, FIGURE 5 shows diagrammatically the associated electrical apparatus, FIGURES 6 to 8 are circuit diagrams of the amplifiers used in the apparatus, FIGURES 9 and 10 are tables showing the voltages obtained at two different points in the apparatus, FIGURE 11 shows diagrammatically a modification of the apparatus of FIGURE 5, and FIGURE 12 illustrates a component for use in the apparatus of the invention.

In the improved apparatus of this invention an image of the character to be recognised is presented on a transducer matrix comprising a plurality of light sensitive devices and selected ones of these transducers are connected in sets to adding devices, one for each of the characters to be recognised, such that the output from any one adding device will be greater than that obtained from any other adding device when the character appropriate to that set is presented on the matrix.

Each set of transducers is preferably so selected that the sum of the signals obtained from the set divided by the number of transducers in the set minus one-half the sum of the signals obtained from all the transducers divided by the number of transducers in the set is a maximum.

The apparatus may also include means for operating on the signals obtained from each adding device whereby that signal having the greatest magnitude is preserved and the other signals are reduced in magnitude or made zero.

Referring firstly to FIGURES 1 to 4, it will be seen that when an image of a character is presented on a transducer mosaic comprising 81 transducers $T_1$ to $T_{81}$ there will be a number of transducers which provide an output, assuming that output is obtained from those transducers on which the image lies, and that there will be a large number of transducers which give no output.

The invention is concerned to provide a method whereby the outputs from a selected number of transducers may be combined to provide a signal which, assuming that the transducers have been selected for recognising the letter A, will be a maximum when the letter A is presented on the transducer mosaic and will always be smaller than this maximum when any other letter is presented.

In the practical case illustrated where it has been found by experiment that eighty-one transducers are adequate to provide discrimination between the various letters of the alphabet, it can be shown that the necessary condition for accurate recognition will be obtained if the transducers are selected in such manner that $$\frac{1}{m}\sum_{m}x-\frac{1}{2m}\sum_{81}x$$

is a maximum, $x$ being the output from the individual transducers and $m$ being the number of selected transducers in the set. Applying this to the condition shown in FIGURES 1 to 4 wherein the letters there shown are enlargements of upper case typewritten letters A, B, C and D, it will be found that the required set of transducers for each letter will be as follows:

(A) 5, 13, 14, 22, 23, 31, 32, 33, 39, 40, 42, 48, 49, 50, 51, 57, 58, 59, 60, 66, 70, 74, 75, 76, 78, 79, 80 (Total No. 27).

(B) 2, 3, 4, 5, 6, 7, 11, 12, 13, 16, 21, 25, 26, 30, 31, 34, 39, 40, 41, 42, 43, 49, 53, 58, 62, 67, 71, 74, 75, 76, 77, 78, 79 (Total No. 33).

(C) 4, 5, 6, 7, 8, 12, 13, 16, 17, 21, 25, 26, 29, 30, 38, 39, 47, 48, 53, 57, 61, 62, 66, 67, 70, 71, 76, 77, 78, 79 (Total No. 30).

(D) 2, 3, 4, 5, 6, 13, 15, 16, 22, 25, 31, 35, 40, 49, 52, 53, 58, 61, 67, 69, 70, 74, 75, 76, 77, 78 (Total No. 26).

It will be seen from examination of FIGURES 1 to 4 that the set of transducers selected for recognising each letter includes those which give large outputs (the output being calculated on the basis of the area of the transducers covered by the image) and that transducers which give smaller outputs are omitted.

It has been found that such selection of transducers will still enable letters or other characters to be recognised if they are somewhat distorted, for example owing to imperfection in shape due to typing or printing defects. Compensation for gross defects in typing or printing could be obtained if required at the expense of increased complication by using a greater number of transducers.

Referring now to FIGURES 5 to 8 which show the electrical equipment required for recognising the upper case letters A to D of FIGURES 1 to 4, it will be seen that the output (assumed to be positive) of each of the twenty-seven transducers T in the set selected for recognising the letter A is applied each through one of the twenty-seven resistors $12_A$, all of magnitude R, to the input of an adding device which consists of a high gain D.C. amplifier $G_A$ which produces a change in sign and which is provided with a feedback circuit including resistor 13 of magnitude $R/27$. In a similar manner the outputs of the sets of transducers selected for recognising the characters B, C and D are applied through resistors $12_B$, $12_C$ and $12_D$ respectively to adding devices consisting of amplifiers $G_B$, $G_C$ and $G_D$, the feedback resistors 14, 15 and 16 being in this case of magnitude $R/23$, $R/30$ and $R/26$ respectively. In addition there is applied to the inputs of the amplifiers as feedback the output of a high gain D.C. amplifier $G_F$ which receives the outputs of all the eighty-one transducers through respective resistors 17 all of magnitude R. The amplifier $G_F$ has a feedback circuit including the resistor 18 of magnitude $R/81$ and feeds its output to the inputs of amplifiers $G_A$ to $G_D$ through resistors 19 to 22 all of magnitude $2R/81$.

By this means there is obtained at the output terminal of each amplifier G a signal which in the case of amplifier $G_A$ is of the form $$\frac{1}{27}\sum_{27}x-\frac{81}{2.27}\cdot\frac{1}{81}\sum_{81}x=\frac{\sum_{27}x-\frac{1}{2}\sum_{81}x}{27}$$

The actual output signals calculated on the basis that the output of each transducer is proportional to that part of its area which lies under the image of the character is given in the table of FIGURE 9 from which it will be seen that the greatest (negative) signal is obtained from amplifier $G_A$ when the letter A is presented on the matrix and that smaller negative or positive signals are obtained from the amplifier $G_A$ when the letters B, C or D are presented, the same being true as regards amplifier $G_B$ when letter B is presented, and so on.

The outputs of amplifiers $G_A$ to $G_D$ are fed to respective high gain sign changing D.C. amplifiers $H_A$ to $H_D$ and the outputs of these amplifiers are fed through resistors 23 to 26 to a high gain two-stage D.C. amplifier $H_F$ which does not produce a change of sign. The output of amplifier $H_F$ is applied as feedback to the inputs of amplifiers $H_A$ to $H_D$ through resistors 27 to 30, resistors 23 to 33 being all of magnitude equal to R. This arrangement operates as a form of maximum amplitude filter inasmuch as the signal having the maximum value is passed more or less unchanged in magnitude but changed in sign whereas all smaller signals are reduced towards zero. In addition, unidirectional conductive devices $D_A$ to $D_D$ are connected across the outputs of amplifiers $H_A$ to $H_D$ whereby to eliminate all negative signals. The voltages appearing across the devices $D_A$ to $D_D$ are shown in the table of FIGURE 10 from which it will be seen that output will only exist at the terminal of the amplifier corresponding to the character presented on the transducer matrix.

In order to effect a response to the presence of a character on the matrix, the outputs of amplifiers $H_A$ to $H_D$ are applied to the control grids of respective thyratrons $T_A$ to $T_D$ such that when an output voltage is present the associated thyratron will fire, thereby to energise the relays $R_A$ to $R_D$ closing contacts $S_A$ to $S_D$ in a control circuit.

FIGURE 6 shows a wiring diagram for that part of the circuit including amplifiers $G_A$, $H_A$ and the thyratron $T_A$ and an exactly similar arrangement would be used for the amplifiers $G_B$, $H_B$ and the thyratron $T_B$, and so on.

FIGURE 7 shows a wiring diagram for the amplifier $H_F$ while FIGURE 8 shows a wiring diagram for the amplifier $G_F$. The amplifiers are conventional and do not require explanation except to point out that the control of screen potential is provided to ensure that the amplifier output may be made zero when the input is zero.

It will be appreciated that the arrangements thus far described are suitable for the recognition of four characters, that is the letters A to D, but by providing appropriate additional equipment the whole alphabet may be catered for.

The above discussion of the invention presupposes that the letters or characters are always of approximately constant shape and that they are always projected on to the transducer matrix in substantially the same position. If it is required that the apparatus shall recognise, for example, the letter A, no matter what form of type is used, it is still possible to prescribe a suitable set of transducers which will give a greater output when a letter A of any shape is presented than when any other letter or character is presented but this may involve an increase in size of the matrix and an increase in the number of transducers in each set. The same is true if it is required to recognise each letter or character irrespective of its position on the matrix. However, for many purposes it is possible to prescribe the shape of the letters or characters to be recognised. It is then only necessary to ensure that they are always presented in the same position on the matrix. While a slight movement of the order of a fraction of the width of a transducer will only produce a small variation in output, a displacement which is greater than the width of one transducer may reduce the output to zero.

If, however, the apparatus is required to recognise characters in different forms and/or positions on the mosaic, there may alternatively be provided a separate set of transducers for each form of the character and also for each of the possible positions it may take on the mosaic. This may enable the size of the mosaic to be restricted but using the apparatus so far described will require a separate adding device G, amplifier H, thyratron T and relay R for each set of transducers. This elaboration of equipment may, however, be avoided by the modification of the invention shown in FIGURE 11 wherein, although the transducers are connected together in sets, one for each form and/or position of each character, the sets are grouped in respect of each character and the sets of each group share a common adding device G, amplifier H, thyratron T and relay R.

Figures 1, 2, 3, 4:
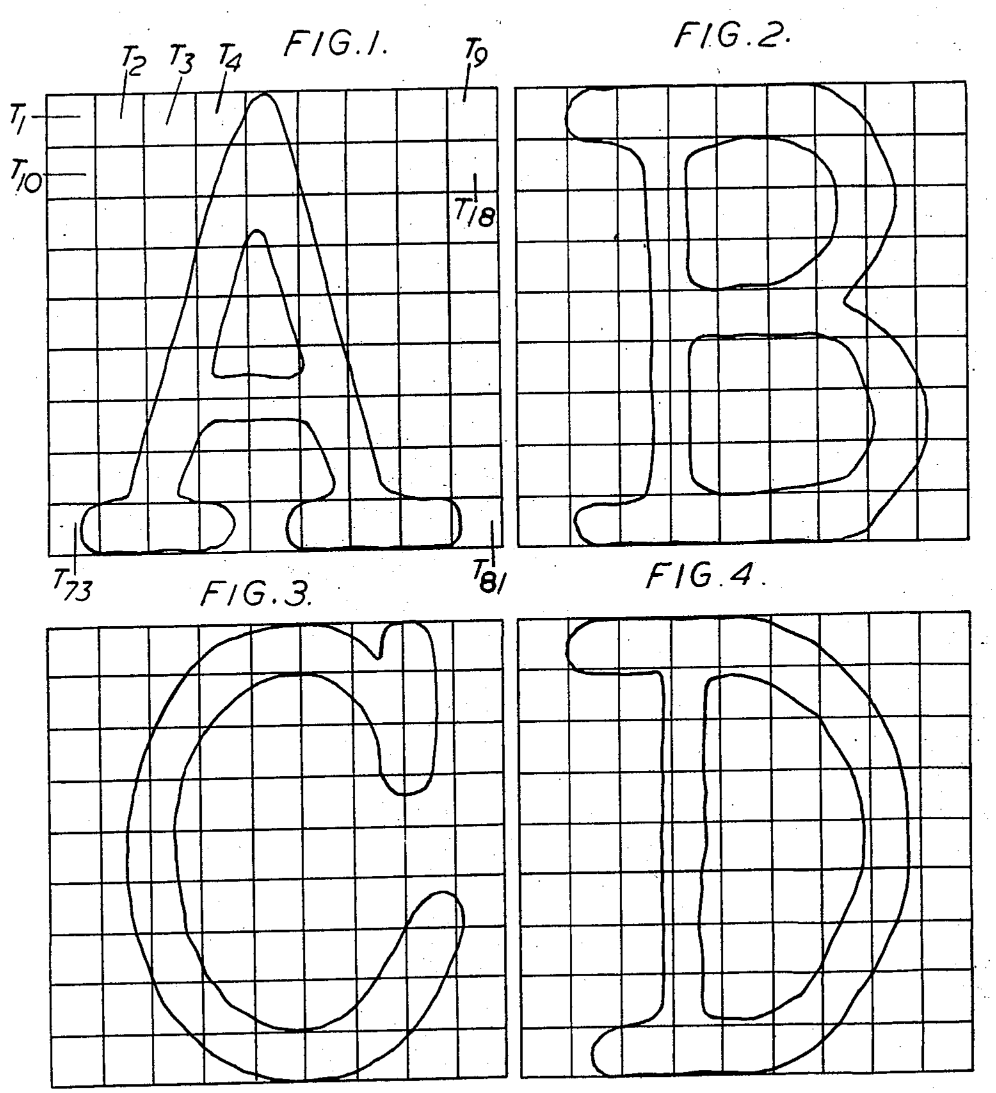
Figure 5:
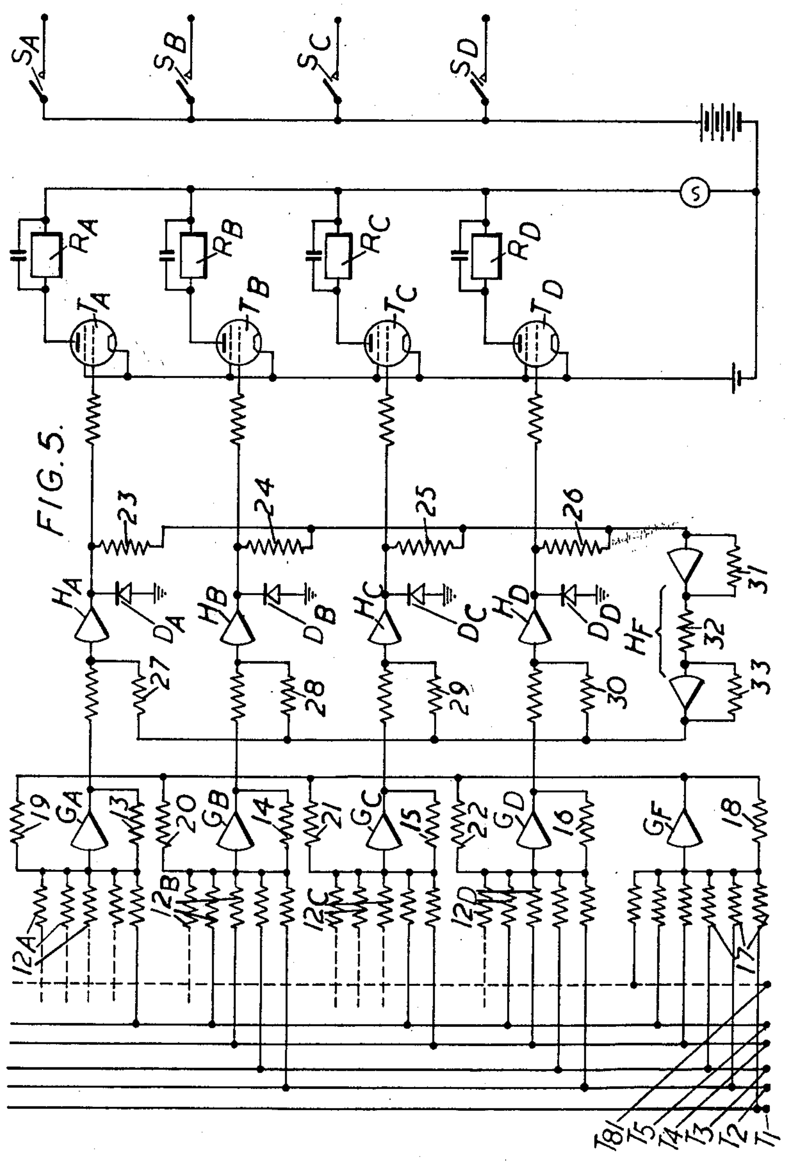
Figures 6, 8:
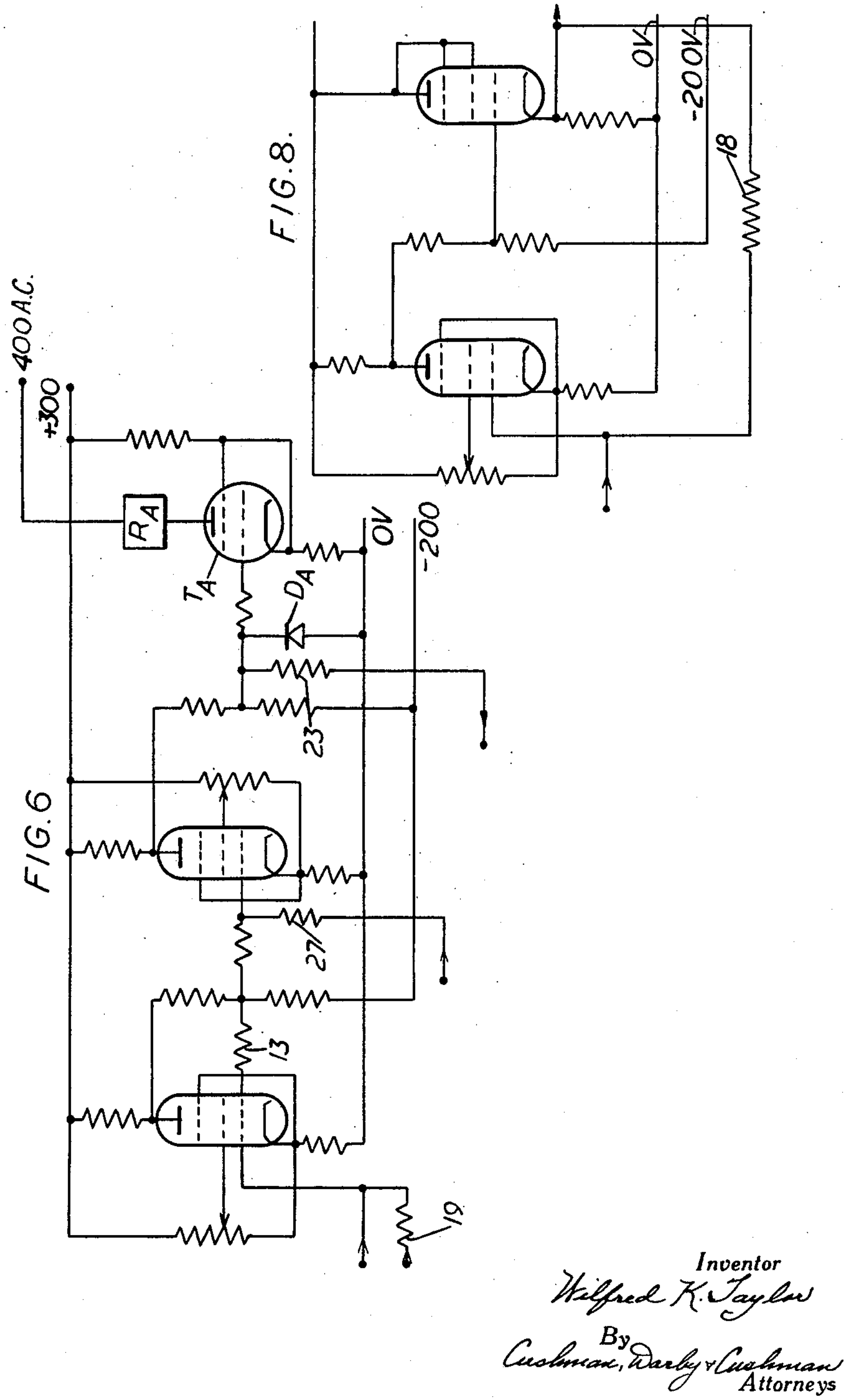
Figure 7:
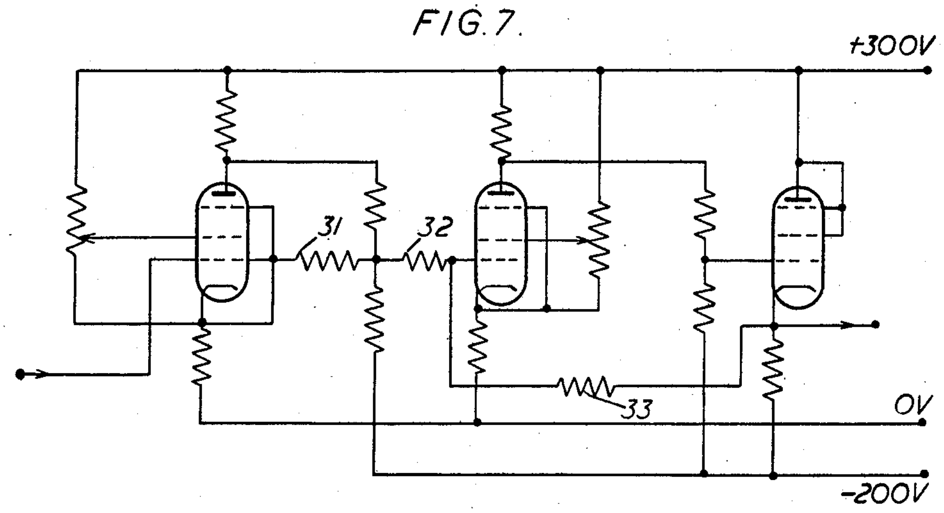
Figure 11:
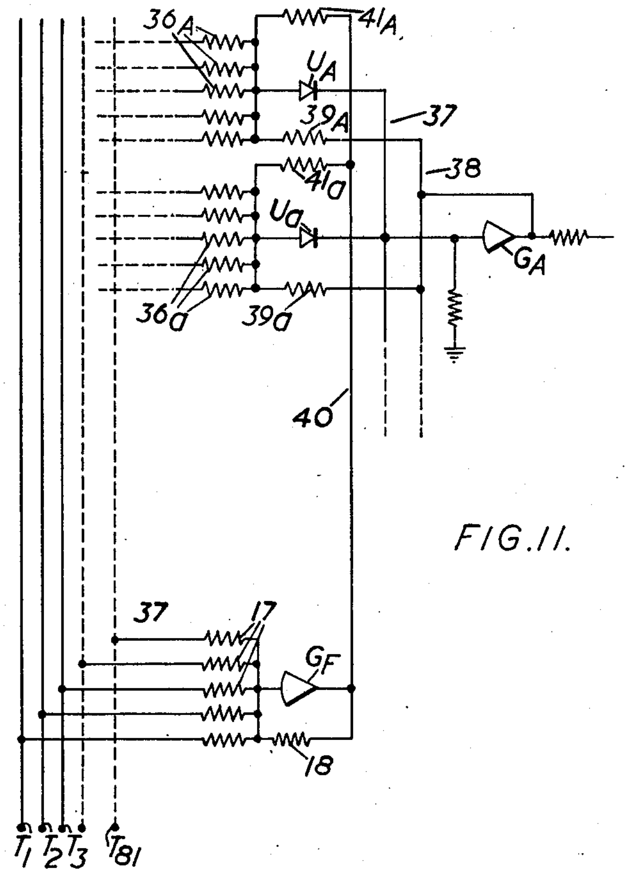

FIGURE 11 illustrates the case where two sets of transducers are connected with a common adding device, the amplifier $G_A$ of FIGURE 5, but it will be appreciated that there could be a very much greater number of sets if required. The first set of transducers, assumed to be those required to recognise the upper case letter A, are connected through equal resistors $\mathbf{36}_A$ with the anode of a rectifier $U_A$ the cathode of which is connected with a busbar 37 to which is also connected the input terminal of amplifier $G_A$. The second set of transducers, assumed to be those required to recognise the lower case letter *a*, are likewise connected through equal resistors $\mathbf{36}_a$ with the anode of a rectifier $U_a$ the cathode of which is connected with the busbar 37. The output terminal of amplified $G_A$ is connected to busbar 38 to supply feedback through resistors $\mathbf{39}_A$ and $\mathbf{39}_a$ to the anodes of rectifiers $U_A$ and $U_a$ while feedback from amplifier $G_F$ is also supplied to the anodes of rectifiers $U_A$ and $U_a$ over busbar 40 and resistors $\mathbf{41}_A$ and $\mathbf{41}_a$. Every other set of transducers of the A group is similarly connected with the busbars 37, 38 and 40 and the arrangement operates in such a way that the only rectifier U which is conductive is that which is connected with the set of transducers having the largest resultant signal at the anode of the rectifier, this resultant signal being the sum of the outputs of the set of transducers and the feedback voltages from the busbars 38 and 40. Accordingly if the letter A is projected on the transducer matrix it will be rectifier $U_A$ which is conductive and the arrangement will operate exactly as that of FIGURE 5 and as though the resistors $\mathbf{36}_a$ and rectified $U_a$ were not present. The arrangement of the amplifiers $G_A$ and $G_F$ and the remaining parts of the apparatus will be the same as that described with reference to FIGURE 5.

It will be appreciated that in this form of the invention the apparatus may be elaborated to the extent required by the desired application. For example using a mosaic of eighty-one transducers a letter A of given shape could be recognised in any position by the use of about ten sets of transducers whereas one hundred sets of transducers would probably be sufficient to recognise this character with a low frequency of error when it is handwritten.

Figure 12:
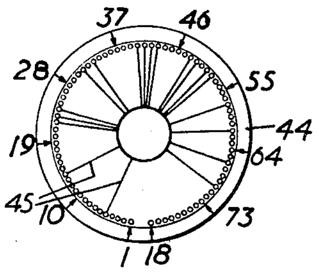

In carrying the invention into effect, the set of resistors for each set of transducers could be manufactured comparatively inexpensively by printed circuit techniques in the form illustrated in FIGURE 12 which comprises a disc 44 formed with a ring of eighty-one terminals some of which are connected by resistive paths 45 with a central common terminal. These discs 44 could be arranged in a pile with busbars connected with the transducers threaded through the eighty-one terminals, all the common terminals of a group representing variations of a single character being connected each through a rectifier with a common character terminal, i.e. the busbar 37 of FIGURE 11.

The invention provides a simplified system of recognition which is particularly appropriate for use when the characters to be recognised can be prescribed and is particularly suitable for use in reading printed matter. It may, however, also be used, for example, for recognising signatures and appropriate combinations of transducers can be selected for each signature to be recognised according to the method described herein.

In all forms of the apparatus herein described the operation of one of the relays R indicates the recognition of a class to which a pattern projected on the transducer mosaic belongs. This act of recognition may be used for a variety of purposes such for example as the control of computers or the sorting of letters, cheques and the like.

If electronic switches instead of the thyratrons T and relays R are provided, the speed of operation can be made very high since the only significant delays are due to stray capacitance, and the speed is almost completely independent of complexity in the pattern.

I claim:

1. Recognition apparatus comprising a matrix of light sensitive transducers, means for projecting on to said matrix an image of a pattern to be recognised, a plurality of adding devices, one for each class of pattern to be recognised, means for connecting at least one different set of transducers with each said adding device, each said set being associated with a different pattern class, a plurality of amplifiers respectively receiving output from said adding devices, a plurality of pattern responsive devices, respectively receiving output from said amplifiers, and means operating on all said amplifiers for suppressing output therefrom except that one providing the largest output.

2. Apparatus for recognising characteristic patterns comprising a matrix of light sensitive transducers, means for projecting a pattern to be recognised on to said matrix, a plurality of signal channels, one for each pattern to be recognised, means for combining and feeding to the input of each channel the outputs from at least one different selected set of transducers and outputs from all said transducers and means operating on the signals in each channel for increasing the contrast between the maximum signal and the remaining signals.

3. Apparatus for recognising characteristic patterns comprising a matrix of light sensitive transducers, means for projecting a pattern to be recognised on to said matrix, a plurality of signal channels, one for each pattern to be recognised, means for combining and feeding to the input of each channel the outputs from at least one different selected set of transducers, and means operating on the signals in each channel for increasing the contrast between the maximum signal and the remaining signals, said means comprising an amplifier in each channel, means for combining the outputs of said amplifiers and means for feeding back the combined outputs to the input of each amplifier.

4. Apparatus for recognising characteristic patterns comprising a matrix of light sensitive transducers, means for projecting an image of a pattern to be recognised on to said matrix, a plurality of signal channels one for each class of patterns to be recognised, means for combining the outputs of preselected ones of said transducers with signals proportional to the number of selected transducers and to the total number of transducers in the matrix to form sets of resultant signals representative of patterns in each class of pattern, means for effectively eliminating from said sets of resultant signals all sets except that having the largest value, and means for applying said set of resultant signals having the largest value in each class to the signal channel of said class.

5. Apparatus as claimed in claim 4 including an amplifier in each said signal channel and means operating on all said amplifiers for suppressing output therefrom except that amplifier providing the largest output.

6. Apparatus for recognizing each of a plurality of different characteristics comprising: means, having a plurality of output terminals, for reading said characteristics and providing signals at different ones of said output terminals for different characteristics read; and a plurality of means, one for each characteristic, for combining the signals at selected terminals in a predetermined manner with a linear function of all the signals that are present at the terminals, for providing a respective plurality of resultant signals one of which indicates the instant characteristic being read by said reading means.

7. Apparatus for recognizing each of a plurality of different characteristics comprising means, having a plurality of different output terminals, for reading said characteristics at different times and providing signals at different sets of said terminals for different characteristics read, and a plurality of means for each characteristic for effectively subtacting a part of the sum of the signals at all said terminals from the sum of the signals at the terminals of a respective one of said sets and effectively dividing the result of the subtraction by the number of terminals in the respective set to provide a plurality of resultant signals which indicate by their relative magnitude which of said different characteristics is being instantly read by said reading means.

8. Apparatus as in claim 7 wherein each subtracting means causes said part to be one-half.

9. Apparatus for recognizing each of a plurality of characters comprising means, having a plurality of output terminals, for reading said characters at different times and providing signals at different sets of said terminals for different characters read, a plurality of adding means respectively coupled to said different sets of terminals for effectively adding the respective sets of signals thereat to cause a plurality of first signals, means for effectively summing the signals at all said terminals and dividing the sum by the number of all said terminals to provide a second signal, means for effectively subtracting from each said first signal a third signal which is equal to one-half the number of said terminals times the magnitude of said second signal to modify each of said first signals accordingly, and means for effectively dividing each of the modified first signals by the number of terminals in the respective set thereof to cause a plurality of respective resultant signals which indicate by their relative magnitude which of said characters is being read by said reading means.

10. In apparatus for recognizing each of a plurality of different characteristics sequentially taken from a matrix having N discrete areas providing N signals to N different lines respectively, the improvement comprising a plurality of first averaging devices respectively pre-associated said different characteristics, each of said devices being connected at its input in accordance with said pre-association to a different respective set of said N lines for causing each said first device to provide its own output signal representative of the average of the signals in its respective set of N lines, one other averaging device coupled to its input to each of said N lines for causing an output signal representing the average of the signals on all said N lines, and means including sign changing means for applying a predetermined portion of the output of said other device as a further input to each of said first averaging devices to cause from any one said first device a signal larger than the signal from each other said first device only when the respective set of N lines for that one first device is the one pre-associated with the characteristic causing the instant signals to the N lines.

11. Apparatus as in claim 10 wherein each of said first and other averaging devices includes means for summing its respective inputs and dividing the sum by the number thereof.

12. Apparatus as in claim 10 wherein each of said first and other averaging devices is connected to each said line as aforesaid by a resistor of value R, and the output of said other device is applied as a further input to each of said first devices as aforesaid via a respective resistor of value $2R/N$.

13. Apparatus as in claim 10 wherein each of said first and other averaging devices includes a respective amplifier having a feedback resistor.

References Cited by the Examiner

UNITED STATES PATENTS

| | | | |
|---|---|---|---|
| 2,682,043 | 6/54 | Fitch | 340—149 |
| 2,881,976 | 4/59 | Greanias | 340—173 |
| 2,898,576 | 8/59 | Bozeman | 340—149 |
| 2,924,812 | 2/60 | Merritt | 340—149 |
| 2,927,303 | 3/60 | Elbinger | 340—149 |
| 3,000,000 | 9/61 | Eldredge | 340—149 |
| 3,069,079 | 12/69 | Steinbuch | 340—146.3 |

FOREIGN PATENTS

| | | |
|---|---|---|
| 794,139 | 4/58 | Great Britain. |
| 796,579 | 6/59 | Great Britain. |

MALCOLM A. MORRISON, *Primary Examiner.*

EVERETT R. REYNOLDS, IRVING L. SRAGOW, *Examiners.*